US009494174B2

(12) United States Patent
Pastecki et al.

(10) Patent No.: US 9,494,174 B2
(45) Date of Patent: Nov. 15, 2016

(54) FLUIDIC BUFFER VOLUME DEVICE WITH REDUCED MIXEDNESS

(71) Applicant: General Electric Company, Schenectady, NY (US)

(72) Inventors: Patrick Edward Pastecki, Pearland, TX (US); Balakrishnan Ponnuraj, Sugar Land, TX (US); James Arthur Simmons, Tampa, FL (US); Ravinder Yerram, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 152 days.

(21) Appl. No.: 14/201,680

(22) Filed: Mar. 7, 2014

(65) Prior Publication Data

US 2015/0252823 A1 Sep. 10, 2015

(51) Int. Cl.
| *F16L 55/04* | (2006.01) |
| *F15D 1/02* | (2006.01) |
| *F02C 7/22* | (2006.01) |
| *F02C 9/40* | (2006.01) |
| *F23R 3/36* | (2006.01) |
| *F23K 5/00* | (2006.01) |
| *F23K 5/14* | (2006.01) |
| *F23N 1/00* | (2006.01) |
| *F23R 3/28* | (2006.01) |
| *F02M 21/02* | (2006.01) |

(52) U.S. Cl.
CPC .............. *F15D 1/025* (2013.01); *F02C 7/22* (2013.01); *F02C 9/40* (2013.01); *F23K 5/007* (2013.01); *F23K 5/14* (2013.01); *F23N 1/00* (2013.01); *F23R 3/28* (2013.01); *F23R 3/36* (2013.01); *F02M 21/0224* (2013.01); *F23N 2021/10* (2013.01); *F23N 2041/20* (2013.01)

(58) Field of Classification Search
USPC ............................................. 138/30, 42, 38
See application file for complete search history.

(56) References Cited

U.S. PATENT DOCUMENTS

| 728,782 A | * | 5/1903 | Tate | ....................... F04F 5/461 |
| | | | | 137/337 |
| 1,064,204 A | | 6/1913 | Furlow | |
| 1,584,315 A | * | 5/1926 | Maxim | .................... F01N 1/087 |
| | | | | 181/269 |

(Continued)

FOREIGN PATENT DOCUMENTS

JP          02301657 A     12/1990

OTHER PUBLICATIONS

European Search Report and Opinion issued in connection with corresponding EP Application No. 15157124.7 on Jul. 22, 2015.

*Primary Examiner* — James Hook
(74) *Attorney, Agent, or Firm* — Fletcher Yoder, P.C.

(57) ABSTRACT

A system includes an inlet pipe configured to convey a fluid and a buffer volume configured to buffer the fluid. The buffer volume includes a smallest diameter tube having a smallest diameter, a first inlet end, and a first outlet end. The first inlet end is configured to receive the fluid from the inlet pipe. The buffer volume also includes an intermediate tube surrounding the smallest diameter tube having a first capped end and a second outlet end. The first capped end is positioned next to the outlet end of the smallest diameter tube. The buffer volume also includes a largest diameter tube surrounding the intermediate tube second capped end and a third outlet end. The second capped end is positioned next to the second outlet end of the intermediate tube. The system also includes an outlet pipe configured to convey the fluid from the buffer volume.

20 Claims, 3 Drawing Sheets

(56) References Cited

U.S. PATENT DOCUMENTS

| | | | | |
|---|---|---|---|---|
| 1,733,901 | A * | 10/1929 | Owen | F23M 7/00 110/175 R |
| 3,131,717 | A * | 5/1964 | Gratzmuller | G05D 16/0647 137/505.18 |
| 3,144,904 | A * | 8/1964 | Kahn | F24H 9/124 122/14.3 |
| 3,302,701 | A * | 2/1967 | Thomas | F22B 37/18 138/38 |
| 3,341,189 | A * | 9/1967 | Rumsey | B61G 11/12 188/314 |
| 3,907,028 | A * | 9/1975 | Lawson | F28D 7/022 138/38 |
| 4,037,615 | A * | 7/1977 | Gongwer | F16K 47/08 137/1 |
| 4,326,554 | A * | 4/1982 | Gongwer | F16K 25/04 137/14 |
| 4,667,841 | A | 5/1987 | Belle | |
| 5,241,863 | A | 9/1993 | Molnar | |
| 5,335,653 | A | 8/1994 | Blomqvist et al. | |
| 5,615,833 | A * | 4/1997 | Robillard | F23D 14/22 239/132.3 |
| 5,770,893 | A * | 6/1998 | Youlton | F03B 13/142 290/42 |
| 6,139,810 | A * | 10/2000 | Gottzmann | B01J 8/009 422/201 |
| 6,473,172 | B1 | 10/2002 | Pelmulder | |
| 7,302,936 | B2 * | 12/2007 | Stolarz | B60K 15/01 123/468 |
| 7,815,721 | B2 | 10/2010 | Wang et al. | |
| 8,206,495 | B2 | 6/2012 | Kwack | |
| 2001/0029735 | A1 * | 10/2001 | Miura | B01B 1/005 60/512 |
| 2006/0162577 | A1 | 7/2006 | Jorgensen et al. | |
| 2007/0110628 | A1 | 5/2007 | Loboda | |
| 2008/0115482 | A1 | 5/2008 | LaGrow et al. | |
| 2010/0050641 | A1 | 3/2010 | Nag | |
| 2010/0205976 | A1 | 8/2010 | Nag et al. | |
| 2012/0118731 | A1 | 5/2012 | Liang et al. | |
| 2012/0156111 | A1 | 6/2012 | Ramos et al. | |
| 2012/0237415 | A1 | 9/2012 | Ramos et al. | |
| 2012/0240766 | A1 | 9/2012 | Kwack | |
| 2013/0001145 | A1 | 1/2013 | Yin et al. | |
| 2013/0032230 | A1 | 2/2013 | Olesen | |

* cited by examiner

FLUIDIC BUFFER VOLUME DEVICE WITH REDUCED MIXEDNESS

BACKGROUND

The subject matter disclosed herein relates to buffer volumes for use within fluid transfer systems.

In systems where fluid is used or consumed over extended periods of time, such as certain power generation systems, there may be several sources of fluid that alternate providing fluid continuously to the system. These several sources of fluid may provide fluids that differ from one another in some characteristics. Sensors can detect these characteristics and provide the detected differences to the systems that utilize the fluid. In response to the different characteristics, the system may adjust operating settings to ensure proper or efficient use of fluid. Unfortunately, detecting the differences, sending the detected characteristics to the system, and/or adjusting the operating settings may take more time than it takes to transfer the fluid from the source to the system.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a fluidic buffer volume device includes an inlet, a multiple of nested tubes, an outlet, and a fluid flow path through the inlet, the multiple of nested tubes, and the outlet. The fluid flow path extends from the inlet to the outlet via a tortuous path between walls of adjacent tubes of the multiple of nested tubes in a first direction from the inlet towards the outlet and in a second direction from the outlet towards the inlet. The fluidic buffer volume device is configured to reproduce a transient event occurring upstream of the inlet in a fluid downstream of the outlet after the fluid travels along the fluid flow path.

In another embodiment, a system includes a fluidic buffer volume device having a first multiple of nested tubes, wherein each tube in the first multiple of nested tubes includes a first inlet end coupled to a first end plate of the fluidic buffer volume device and a first outlet end. The fluidic buffer volume device also includes a second multiple of nested tubes, each tube in the second multiple of tubes includes a second inlet end coupled to a second end plate of the fluidic buffer volume device and a second outlet end. Each of the tubes in the first multiple of nested tubes is disposed between two of the tubes in the second multiple of nested tubes and the first end plate and the second end plate are disposed at opposite ends of the fluidic buffer volume device along a longitudinal axis of the fluidic buffer volume device. The system also includes a first transport pipe configured to convey a fluid through the second end plate to a tube in the second multiple of tubes with a smallest diameter and a second transport pipe configured to convey the fluid from a tube in the second multiple of tubes with a largest diameter.

In another embodiment, a method includes conveying a fluid through a first pipe to a first tube in a multiple of nested tubes of a fluidic buffer volume device, conveying the fluid through the first tube in a first direction to a first outlet end, radially dispersing the fluid from the first tube to a second tube in the multiple of nested tubes surrounding the first tube, conveying the fluid through the second tube in a second direction opposite the first direction, and conveying the fluid from the fluidic buffer volume device through a second pipe.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is related to systems for transferring fluid from one or more sources of fluid (e.g., fuel) to one or more fluid using systems (e.g., gas turbine system). The transfer systems may utilize a buffer volume that has nested tubes as described below to prolong the time and/or distance taken by the fluid to transfer from a source to a consuming system. The nested tubes direct the fluid through a flow path (e.g., tortuous flow path) in which the fluid travels through the interior of one tube, and then is directed back along the exterior of that same tube, until the fluid has passed through all of the nested tubes. Interleaving the tubes enables the buffer volume to occupy a small footprint while minimizing mixture of the fluid and pressure differential.

Figure 1:
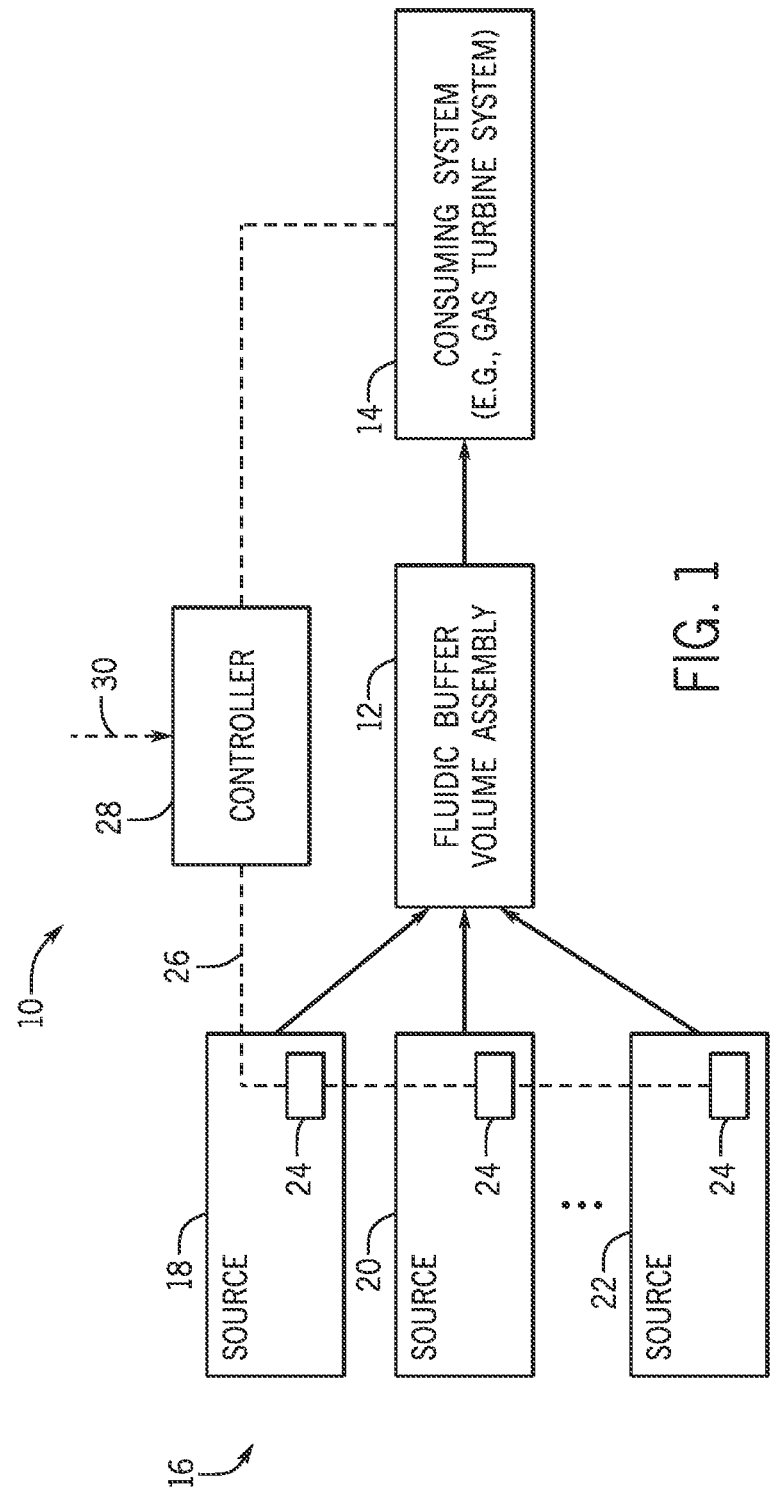
FIG. 1 is a schematic diagram of an embodiment of a fluid transfer system including a fluidic buffer volume device.

FIG. 1 is a schematic diagram of an embodiment of a fluid transfer system 10 including a fluidic buffer volume assembly 12. The fluid transfer system 10 also includes a consuming system 14 and a fluid source 16. The consuming system 14 may include any suitable system that uses or consumes a fluid such as a gasifier, a furnace, a boiler, a reactor, an internal combustion engine, or others. In one embodiment, the consuming system 14 may include a gas turbine system and the fluid in that instance may be fuel, such as gas and/or liquid fuel. The fluid source 16 may provide any number of fluids such as fuel or other feedstock to the consuming system 14. In some embodiments, the consuming system 14 uses fluid from the source 16 continuously over a period of time, such that all the fluid from a first source 18 is consumed. In such an instance, fluid from a second source 20 or additional sources 22 is administered to the consuming system 14. The fluid from the second source 20 or the additional sources 22 may differ from the fluid in the first source 18, and from one another. For example, the first source 18 may contain fluid that has a higher concentration of one compound while the second source 20 has a lower concentration of that compound. The fluid transfer system 10 includes instrumentation such as sensors 24 to monitor and analyze the composition of the fluid upstream of the fluidic buffer volume assembly 12 and convey information 26 to additional instrumentation such as a controller 28 (e.g., a computer-based controller with a processor, memory, and executable code). The information 26 may include detection by the sensors 24 of a transient event (i.e., transient composition change in fluid properties), where fluid entering the volume buffer switches from one source (e.g., source 18) to another source (e.g., source 20). For example, the fluid may transition from a fuel with a first composition, pressure, temperature, heating value, viscosity, or other property, to a fuel with a second composition, pressure, temperature, heating value, viscosity, etc. The controller 28 may adjust the operation settings of the consuming system 14 based upon the information 26 about the differences detected by the sensors 24. The controller 28 may also adjust the operation settings based on other inputs 30, such as inputs from an operator. The controller 28 may use an amount of time to read the signals, process the signals, adjust the operation settings, or any combination thereof, to increase efficiency and maintain operational integrity during a transient event (e.g., switching from the first source 18 to the second source 20 or additional sources 22). The fluidic buffer volume assembly 12 extends the fluid flow path of the fluid from the source 16 over a tortuous path between walls of adjacent tubes, so that the controller 28 has time to make adjustments to the consuming system 14 before the fluid reaches the consuming system 14 and is used.

Figure 3:
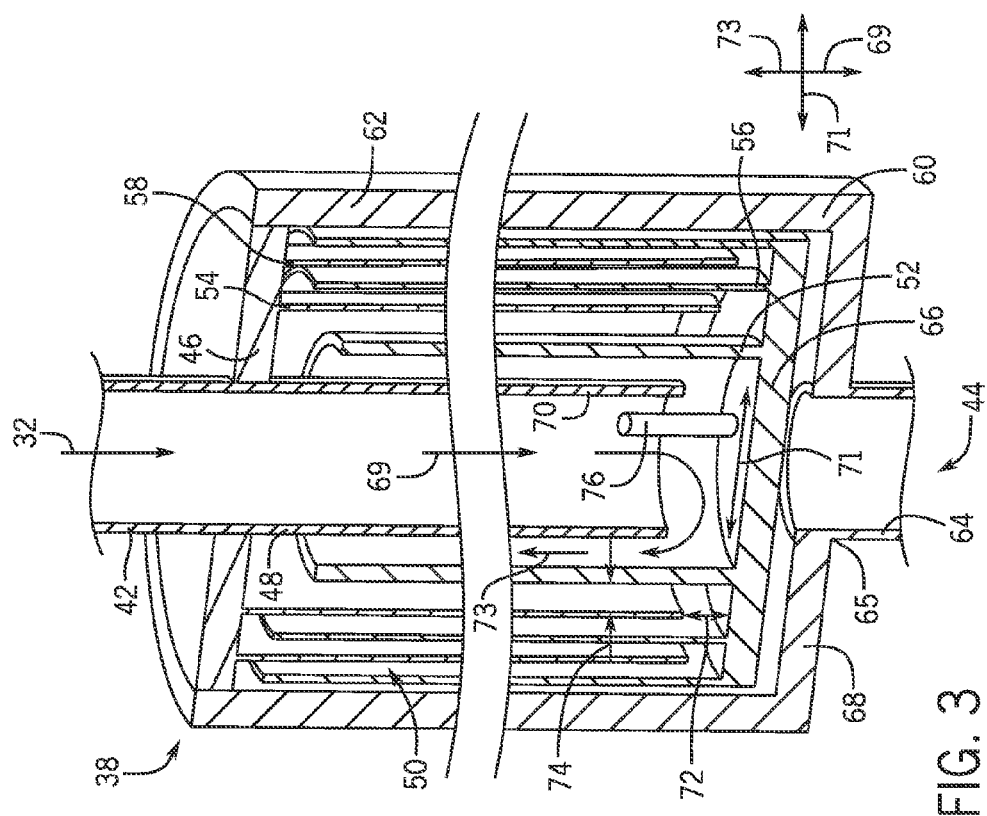
FIG. 3 is a partial cutaway perspective view of an embodiment of a fluidic buffer volume device that may be used within the fluid transfer system of FIG. 1.
Figure 2:
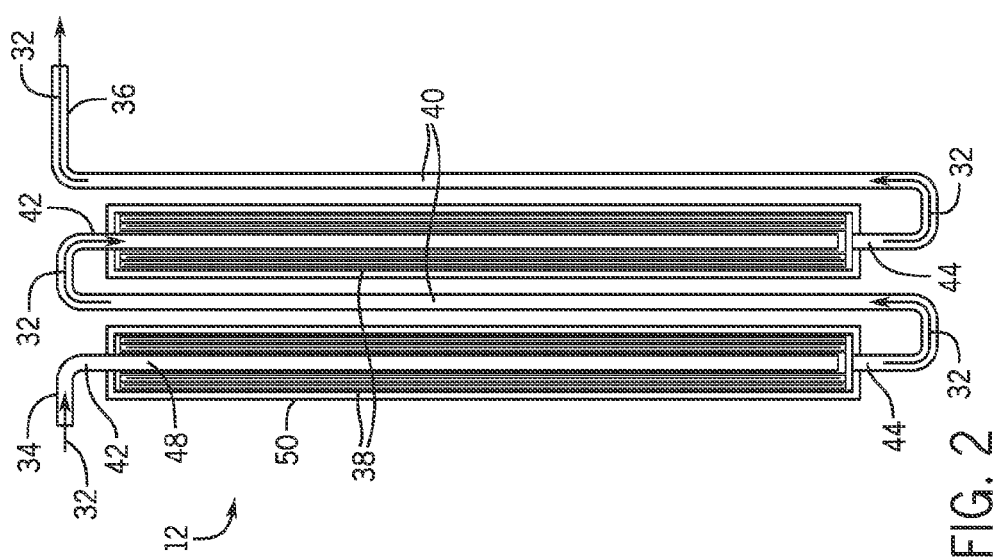
FIG. 2 is a cross-sectional side view of an embodiment of a fluidic buffer volume assembly (e.g., having multiple fluidic buffer volume devices) that may be used within the fluid transfer system of FIG. 1.

FIG. 2 is a cross-sectional side view of an embodiment of the fluidic buffer volume assembly 12 that may be used within the fluid transfer system 10 of FIG. 1. The fluidic buffer volume assembly 12 defines a tortuous fluid flow path 32 that begins at an inlet pipe 34 that receives fluid from the source 16 and ends at an outlet pipe 36 that delivers the fluid to the consuming system 14. The fluidic buffer volume assembly 12 also includes fluidic buffer volume devices 38 and transport tubes 40. As explained in detail below, the fluid flow path 32 may course through the fluidic buffer volume devices 38 in a path that minimizes fluid mixing and pressure drop. The fluidic buffer volume device 38 is also configured to provide a residence time for the fuel within the fluidic buffer volume device 38 to enable a signal representative of the analysis of the fuel to be communicated to enable adjustment of operating conditions of the consuming system 14. Each fluidic buffer volume device 38 includes an inlet 42 and an outlet 44. The inlet 42 conveys the fluid to a first tube 48 within a plurality of nested tubes 50. The nested tubes 50, as illustrated, may include concentric annular tubes that define concentric annular passages between the tubes. Geometry of the fluidic buffer volume device 38, and the nested tubes 50, may vary between various embodiments, with FIG. 3 showing an additional configuration that may define a tortuous fluid flow path 32. The nested tubes 50 are not always concentric, in other embodiments the nested tubes 50 may be arranged in other formations and other shapes. For example, the nested tubes 50 may include cross-sectional shapes with three, four, five, six, seven, eight, or more sides. Additionally, while the illustrated embodiment shows two fluidic buffer volume devices 38 and two transport pipes or tubes 40, other embodiments may employ 1, 2, 3, 4, 5, 6, 7, 8, 9, 10, or more fluidic buffer volume devices 38 and transport tubes 40. As illustrated, one or more pipes may interconnect one or more devices 38. The fluidic buffer volume assembly 12 may include fluidic buffer volume devices 38 of any suitable length and diameter. For example, the fluidic buffer volume device 38 may have a length less than one meter or greater than ten meters. The fluidic buffer volume device 38 may also have an outer diameter less than approximately thirty centimeters, an outer diameter of 40 centimeters, 50 centimeters, 60 centimeters, 70 centimeters, an outer diameter greater than one meter, or any diameter in between. Increasing the number, diameter, or length of the fluidic buffer volume devices 38 will increase the overall volume of the fluidic buffer volume assembly 12 and thus increase the delay time provided by the fluidic buffer volume assembly 12. The total volume of the fluidic buffer volume assembly 12 may be between approximately 1,000 and 5,000 liters, between approximately 1,500 and 3,500 liters, between approximately 1,750 and 2,750 liters, between approximately 2,000 and 2,500 liters, or any volume in between.

FIG. 3 is a cross-sectional detailed view of an embodiment of the fluidic buffer volume device 38 that may be used within the fluid transfer system 10 of FIG. 1. The inlet 42 of the fluidic buffer volume device 38 extends through a first end cap 46 to a first nested tube 48 of a set of nested tubes 50. The set of nested tubes 50 includes a plurality of tubes of various sizes that are at least partially overlapping, with each smaller tube positioned at least partially within the larger tubes. The illustrated embodiment includes seven nested tubes (i.e., the first nested tube 48, a second nested tube 52, a third nested tube 54, a fourth nested tube 56, a fifth nested tube 58, a sixth nested tube 60, and a seventh outer wall tube 62) and an outlet 64 at an end 65 of the fluidic buffer volume device 38 opposite from the inlet 42. As illustrated, the second 52, fourth 56, and sixth 60 nested tubes are attached to a second end cap 66 that is spaced away from the first 50, third 54, and fifth 58 nested tubes. The second end cap 66 is also spaced away from a third end cap 68 that is coupled to the outlet 64. The third end cap 68 is connected to the seventh outer wall tube 62. The seventh outer wall tube 62 may maintain any pressure differential between the interior of the fluidic buffer volume device 38 and the exterior of the fluidic buffer volume device 38 (e.g., atmospheric pressure). The seventh outer wall tube 62 is not connected to the second end plate 66. The illustrated embodiment thus demonstrates that the fluid flow path 32 is continuous from the inlet 42, around each of the tubes in the set of nested tubes 50, to the outlet 64.

Specifically, the fluid flow path 32 enters through the inlet 42 and then travels the length of the first nested tube 48 in a first longitudinal direction 69. At an end 70 of the first nested tube 48, the second end cap 66 radially 71 disperses the fluid flow path 32 around the end 70 and directs it between the first nested tube 48 and the second nested tube 52 back in a second longitudinal direction 73 the first end cap 46. The fluid flow path 32 continues flowing between the first end cap 46 and the second end cap 66 through the second nested tube 52, third nested tube 54, fourth nested tube 56, fifth nested tube 58, and sixth nested tube 60. These tubes may collectively be referenced as intermediate tubes. The fluidic buffer volume device 38 may include any number of intermediate tubes. For example, the fluidic buffer volume device 38 may include 0 to 100, 1 to 50, 2 to 30, 3 to 20, 4 to 15, or 5 to 10, or more intermediate tubes. The number of intermediate tubes will influence the overall length of the fluid flow path 32, and therefore the time delay of the fluidic buffer volume device 38 and the fluidic buffer volume assembly 12.

After the fluid flow path 32 traverses between the fifth nested tube 58 and the sixth nested tube 60, the first end cap 46 once more radially disperses the fluid flow path 32. After flowing between the sixth nested tube 60 (i.e., the final intermediate nested tube) and the seventh outer wall tube 62, the fluid flow path 32 is not dispersed by the second end cap 66, but instead flows along between the second end cap 66 and the third end cap 68, and subsequently exits the fluidic buffer volume device 38 through the outlet 64. While the illustrated embodiment includes seven nested tubes, which is an odd number, one of ordinary skill in the art will understand that the set of nested tubes 50 may include an even number of nested tubes. In the instance of an even number of nested tubes, the inlet 42 and the outlet 64 may both be on the same end of the fluidic buffer volume device 38, and the fluidic buffer volume device 38 may only include two end caps (e.g., the first end cap 46 and the second end cap 66). That is, if the illustrated embodiment is used as an example, the fluid flow path 32 may exit up after flowing between the fifth nested tube 58 and the sixth nested tube 60 rather than flowing passed the seventh outer wall tube 62 and exiting down As mentioned above, the intermediate tubes are attached to one end cap (e.g., 46, 66) and are spaced from the other end cap (e.g., 46, 66). The spacing from the end caps (e.g., 46, 66) may be defined as an offset height 72. While the offset height 72 illustrated in FIG. 3 is only labeled for one tube (i.e., third nested tube 54) each nested tube in the set of nested tubes 50 has a designated offset height 72. In certain embodiments, the offset height 72 may be determined as the optimal distance to promote the least amount of mixing and pressure drop within the fluidic buffer volume device 38. The offset height 72 may be constant between all of the nested tubes in the set of nested tubes 50 or different for each tube. As illustrated, the offset height 72 may be smaller for each successive outer tube (e.g., the offset height 72 for the fifth nested tube 58 is smaller than the offset height 72 for the third nested tube 54, etc.). Furthermore, each consecutive pair of nested tubes may define a radial offset 74 that is the difference between a diameter of one nested tube and a diameter of the next nested tube. The radial offset 74 may also be calibrated to promote the least amount of mixing and pressure drop. Additionally, the offset height 72 may be determined by the radial offset 74. For example, the offset height 72 of one nested tube may be calibrated to be less than two times the radial offset 74 between that nested tube and the immediately previous nested tube. The offset height 72 for each tube may be maintained and secured by one or more anchor rods 76. While only one anchor rod is illustrated, each nested tube may include the anchor rod 76 attached between the outlet end (e.g., end 70) and the proximate end cap (e.g., 46, 66). Moreover, each nested tube may include 1, 2, 3, 4, or more anchor rods 76 positioned at the end (e.g., end 70) of each nested tube, or in other locations along the length of the nested tubes, to secure the nested tube and maintain the offset height 72. The anchor rods 76 provide structural support for the fluidic buffer volume device 38 as well as flow guidance to the buffer volume within the device 38.

Figure 4:
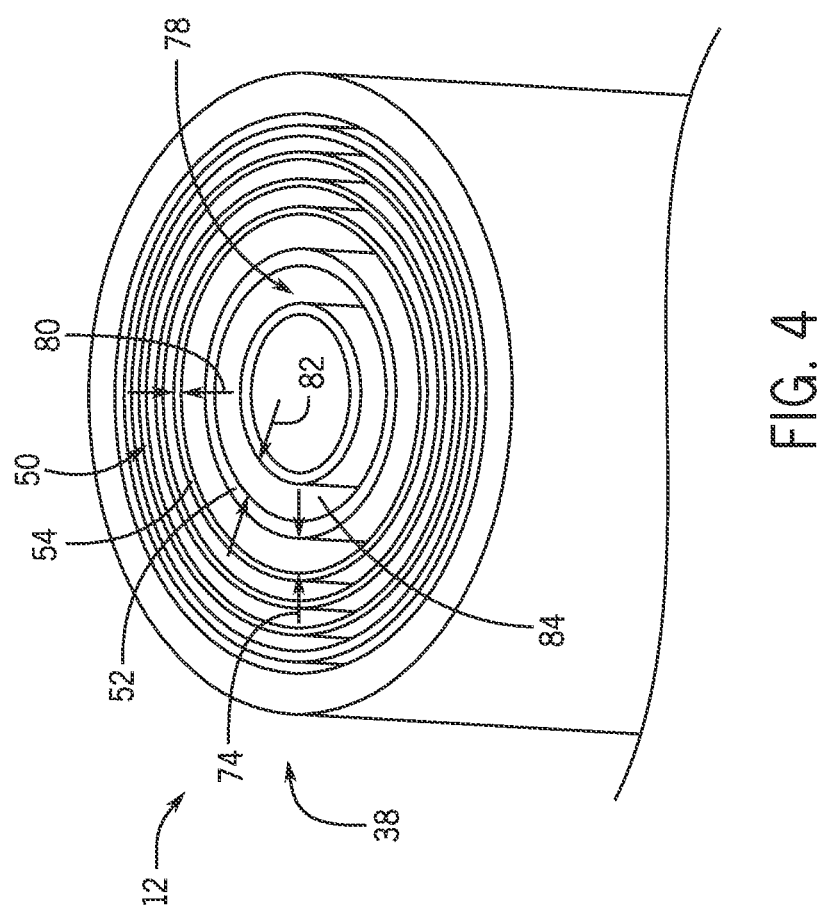
FIG. 4 is a cutaway perspective end view of an embodiment of a fluidic buffer volume device that may be used within the fluid transfer system of FIG. 1.

FIG. 4 is a cross-sectional end view of an embodiment of the fluidic buffer volume device 38 of the fluidic buffer volume assembly 12 that may be used within the fluid transfer system 10 of FIG. 1. As explained above, the fluidic buffer volume device 38 includes the set of nested tubes 50 with radial offsets 74 between each pair in the set of nested tubes 50 (e.g., the first nested tube 48 and the second nested tube 52, the second nested tube 52 and the third nested tube 54, etc.). The radial offset 74 for each pair of nested tubes may be proportional to a working volume 78 for that respective pair of nested tubes. The working volume 78 is the geometric volume between one nested tube and an adjacent nested tube. For example, in embodiments where the nested tubes are straight, the working volume 78 between the second nested tube 52 and the third nested tube 54 is defined by an inside radius 80 of the third tube 52, an outside radius of the second tube 82, and the length of the tubes including the offset height 72 at either end. Each pair of adjacent tubes may similarly define a working volume 78. The inner radius (e.g., inside radius 80) also defines a tube volume 84 within each respective tube. The tube volume 84 increases from the innermost tube 48 to the outermost tube 62 of the plurality of nested tubes 50. In this way, the fluidic buffer volume device 38 is configured to lower a flow velocity of the fluid as it travels along the fluid flow path 32 by repeatedly dispersing the fluid from a smaller tube volume 84 to a larger tube volume 84 while minimizing mixing of the fluid. In order to maintain low pressure drop within the fluidic buffer volume device 38, it may be beneficial to maintain a substantially equivalent working volume 78 for each pair of nested tubes. Substantially equivalent means that each working volume 78 is equivalent to within approximately five percent of the volume for each working volume 78. Since the volume of the volume layer 78 depends at least in part on the total radius for each nested tube, tubes with a larger radius may decrease the radial offset 74 (as illustrated in FIG. 4) to maintain substantially equivalent volumes for the working volumes 78.

While the illustrated embodiment shows a decrease in radial offset 74 for each successive pair of nested tubes, other embodiments may include a set of nested tubes 50 in which each pair of nested tubes has the same radial offset 74, or some other configuration for radial offset 74. Additionally, while the set of nested tubes 50 is shown to be concentric, other embodiments may include tubes that are not concentric, or that only have some subset of tubes that are concentric.

Technical effects of the invention include a fluidic buffer volume assembly 12 that includes transport pipes and a fluidic buffer volume device 38 that conveys fluid while avoiding mixing and pressure drop. The fluidic buffer volume assembly 12 conveys the fluid for a delay time which may give a fluid transport system 10 extra time to adjust to a transition in the source 16 of the fluid (e.g., first source 18 to second source 20). The fluidic buffer volume assembly 12 includes a set of nested tubes 50 that transports the fluid along a fluid flow path 32 from the inside of one tube through an outlet end of that tube and along the outside edge of that same tube in the opposite direction. The fluid flow path 32 increases the likelihood that the fluid properties detected as the fluid enters the volume buffer are substantially equivalent to the fluid properties exiting the fluidic buffer volume assembly 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a fluidic buffer volume device, comprising:
     an inlet defined by an inlet wall;
     a plurality of nested tubes defining annular flow paths between walls of adjacent tubes, wherein a portion of the inlet wall is centrally disposed within the plurality of nested tubes in a concentric arrangement;
     an outlet; and
     a fluid flow path through the inlet, the plurality of nested tubes, and the outlet, wherein the fluid flow path extends from the inlet to the outlet via a tortuous path through the annular flow paths between the walls of adjacent tubes of the plurality of nested tubes in a first direction from the inlet towards the outlet and in a second direction from the outlet towards the inlet;
     wherein the fluidic buffer volume device is configured to reproduce a transient event occurring upstream of the inlet in a fluid downstream of the outlet after the fluid travels along the fluid flow path, and wherein a respective radial offset between the walls of the adjacent tubes of the plurality of nested tubes decreases from an innermost pair of adjacent tubes to an outermost pair of adjacent tubes to minimize a pressure drop of the fluid within the fluidic buffer volume device.

2. The system of claim 1, wherein the fluid comprises a fuel and the transient event comprises a change in a composition of the fuel.

3. The system of claim 2, comprising a gas turbine, and a fuel flow path from a fuel source to the gas turbine, wherein the fluidic buffer volume device is located along the fuel flow path upstream of the gas turbine.

4. The system of claim 3, comprising instrumentation to analyze the composition of the fuel upstream of the inlet of the fluidic buffer volume device, and the fluidic buffer volume device is configured to provide a residence time for the fuel within the fluidic buffer volume device to enable a signal from the instrumentation representative of the analysis of the fuel to be communicated to enable adjustment of operating conditions of the gas turbine as the fuel is provided to the gas turbine.

5. The system of claim 1, wherein each tube of the plurality of nested tubes defines a tube volume within the respective tube, and the tube volume increases from an innermost tube to an outermost tube of the plurality of nested tubes, and the fluidic buffer volume device is configured to lower a flow velocity of the fluid as it travels along the fluid flow path by repeatedly dispersing the fluid from a smaller tube volume to a larger tube volume while minimizing mixing of the fluid.

6. The system of claim 1, wherein the walls between adjacent tubes of the plurality of nested tubes define a working volume, and the working volume for each pair of walls between adjacent tubes is between approximately 70 to 120 percent of a mean working volume for all of the pairs of walls between adjacent tubes.

7. The system of claim 1, comprising a fluidic buffer volume assembly comprising at least two fluidic buffer volume devices coupled via a pipe.

8. The system of claim 1, wherein the tortuous path comprises at least a first path portion that extends in the first direction, a second path portion that extends in the second direction, and a third path portion that extends in the first direction, wherein the second path portion is disposed between the first and third path portions.

9. The system of claim 1, wherein the fluidic buffer volume device comprises a first end adjacent the inlet and a second end adjacent the outlet, the first end comprises a first external end plate and an internal end plate, the second end comprises a second external end plate, the first and second external end plates extend across the first and second ends respectively between an inner surface of an outer wall tube, the outer wall tube is an outermost tube of the plurality of nested tubes, the internal end plate is disposed between the first and second external end plates, and the internal end plate extends across an end of a second tube, wherein the second tube is adjacent the outer wall tube.

10. A system, comprising:
    a fluidic buffer volume device, comprising:
      a first plurality of nested tubes, wherein each tube in the first plurality of nested tubes comprises a first inlet end coupled to a first end plate of the fluidic buffer volume device and a first outlet end; and
      a second plurality of nested tubes, wherein each tube in the second plurality of tubes comprises a second inlet end coupled to a second end plate of the fluidic buffer volume device and a second outlet end;
      wherein each of the tubes in the first plurality of nested tubes is disposed between two of the tubes in the second plurality of nested tubes, and the first end plate and the second end plate are disposed at opposite ends of the fluidic buffer volume device along a longitudinal axis of the fluidic buffer volume device;
      a first transport pipe configured to convey a fluid through the second end plate to a first tube in the second plurality of tubes with a smallest diameter, wherein the first tube is centrally disposed within both the first and second pluralities of nested tubes in a concentric arrangement; and
      a second transport pipe configured to convey the fluid from a second tube in the second plurality of tubes with a largest diameter, wherein the second tube is an outermost tube of both the first and second pluralities of nested tubes;
      wherein a respective radial offset between walls of adjacent tubes of the first and second pluralities of nested tubes decreases from an innermost pair of adjacent tubes to an outermost pair of adjacent tubes to minimize a pressure drop of the fluid within the fluidic buffer volume device.

11. The system of claim 10, comprising an anchor rod attached to one of the tubes in the first plurality of nested tubes or the second plurality of nested tubes, wherein the anchor rod is configured to stabilize the respective tube attached to the anchor rod.

12. The system of claim 11, wherein the anchor rod is positioned at an end of the tube and is configured to maintain an offset height of the tube between an open end of the tube and the first end plate or the second end plate.

13. The system of claim 10, comprising two or more sources configured to convey the fluid to the first transport pipe.

14. The system of claim 10, wherein each pair of adjacent tubes in the fluidic buffer volume device defines a working volume, and each working volume is substantially equivalent.

15. The system of claim 10, wherein a tube in the second plurality of tubes with a largest diameter is configured to maintain a pressure differential between an interior of the fluidic buffer volume device and an exterior of the fluidic buffer volume device.

16. A method, comprising:
    conveying a fluid through a first pipe to a first tube in a plurality of nested tubes of a fluidic buffer volume device, wherein the first tube is centrally disposed within the plurality of nested tubes in a concentric arrangement and forms an inlet into the fluidic buffer volume device, and wherein a respective radial offset between walls of adjacent tubes of the plurality of nested tubes decreases from an innermost pair of adjacent tubes to an outermost pair of adjacent tubes to minimize a pressure drop of the fluid within the fluidic buffer volume device;
    conveying the fluid through the first tube in a first direction to a first outlet end; radially dispersing the fluid from the first tube to a second tube in the plurality of nested tubes, the second tube surrounding the first tube;
    conveying the fluid through the second tube in a second direction opposite the first direction along an annular flow path; and
    conveying the fluid from the fluidic buffer volume device through a second pipe.

17. The method of claim 16, comprising conveying the fluid through the first pipe from at least two alternating sources of the fluid.

18. The method of claim 16, comprising radially dispersing the fluid from the second tube and conveying the fluid through additional tubes of the plurality of nested tubes along additional annular flow paths.

19. The method of claim 16, wherein conveying the fluid through a second pipe comprises conveying the fluid in the first direction.

20. The method of claim 16, wherein conveying the fluid through a second pipe comprises conveying the fluid in the second direction.

* * * * *